US010421477B2

(12) United States Patent
Fricke (10) Patent No.: US 10,421,477 B2
(45) Date of Patent: Sep. 24, 2019

(54) ENERGY-ABSORBING STEERING COLUMN ASSEMBLY

(71) Applicants: THYSSENKRUPP PRESTA AG, Eschen (LI); THYSSENKRUPP AG, Essen (DE)

(72) Inventor: Sascha Fricke, Hard (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 91 days.

(21) Appl. No.: 15/805,827

(22) Filed: Nov. 7, 2017

(65) Prior Publication Data

US 2019/0135328 A1    May 9, 2019

(51) Int. Cl.
*B62D 1/185* (2006.01)
*B62D 1/184* (2006.01)
*B62D 1/19* (2006.01)

(52) U.S. Cl.
CPC ............. *B62D 1/195* (2013.01); *B62D 1/184* (2013.01); *B62D 1/185* (2013.01)

(58) Field of Classification Search
CPC ........ B62D 1/185; B62D 1/195; B62D 1/184; B62D 1/19; B62D 1/192; F16F 7/123; F16F 7/128
USPC ................................... 74/493; 280/777, 775
See application file for complete search history.

(56) References Cited

U.S. PATENT DOCUMENTS

| 5,562,307 | A | 10/1996 | Connor |
| 9,056,628 | B2 | 6/2015 | Russell et al. |
| 9,669,862 | B1 * | 6/2017 | Dubay .................. B62D 1/192 |
| 9,834,246 | B1 * | 12/2017 | Woycik .................... F16F 7/12 |
| 2010/0300237 | A1 | 12/2010 | Ridgway et al. |
| 2011/0210536 | A1 | 9/2011 | Monteil et al. |
| 2012/0266716 | A1 | 10/2012 | Sulser et al. |

(Continued)

FOREIGN PATENT DOCUMENTS

| DE | 102008034807 B3 | 10/2009 |
| DE | 102008007093 A3 | 11/2009 |

(Continued)

OTHER PUBLICATIONS

PCT Application No. PCT/EP2018/079872, International Search Report and Written Opinion, dated Jan. 25, 2019.

*Primary Examiner* — Keith J Frisby
(74) *Attorney, Agent, or Firm* — Lathrop Gage L.L.P.

(57) ABSTRACT

One steering column assembly includes a bracket connectable to a vehicle, a jacket with an aperture and a wall thickness at the aperture, a steering shaft supported by the jacket, a locking assembly, a bending strap having jacket and rack portions, and an engaging body irrotatably positioned at least partially inside the aperture. The steering shaft is rotatable relative to the jacket about a longitudinal axis of the steering shaft, and the rack portion overlays and is separated from the jacket portion. The engaging body is coupled to or forms part of the bending strap jacket portion and thereby couples the bending strap rack portion to the jacket. The engaging body has a thickness that extends toward the longitudinal axis past the jacket wall thickness at the aperture. The locking assembly is configured to selectively restrict the rack portion from moving relative to the bracket.

16 Claims, 7 Drawing Sheets

(56) References Cited

U.S. PATENT DOCUMENTS

2016/0368524 A1 12/2016 Tinnin
2017/0259842 A1 9/2017 Dubay et al.

FOREIGN PATENT DOCUMENTS

DE 102008007093 B3 * 11/2009
DE 102015204894 A1 9/2016

* cited by examiner

ENERGY-ABSORBING STEERING COLUMN ASSEMBLY

FIELD OF THE DISCLOSURE

The disclosure relates generally to the field of steering column assemblies for motor vehicles. More specifically, the disclosure relates to a steering column assembly configured to absorb energy during a collision.

SUMMARY

The following presents a simplified summary of the disclosure in order to provide a basic understanding of some aspects of the disclosure. This summary is not an extensive overview of the disclosure. It is not intended to identify critical elements of the disclosure or to delineate the scope of the disclosure. Its sole purpose is to present some concepts of the disclosure in a simplified form as a prelude to the more detailed description that is presented elsewhere.

According to an embodiment, a steering column assembly for use with a vehicle includes a bracket connectable to the vehicle, a jacket having an aperture and a wall thickness at the aperture, a steering shaft supported by the jacket, a bending strap having a jacket portion and a rack portion, a locking assembly configured to selectively restrict the rack portion from moving relative to the bracket, and an engaging body irrotatably positioned at least partially inside the jacket aperture. The steering shaft is rotatable relative to the jacket about a longitudinal axis of the steering shaft, and the rack portion overlies and is separated from the jacket portion. The engaging body is coupled to or forms part of the bending strap jacket portion and thereby couples the bending strap rack portion to the jacket, and the engaging body has a thickness that extends toward the longitudinal axis of the steering shaft past the jacket wall thickness at the aperture.

According to another embodiment, a steering column assembly for use with a vehicle includes a bracket connectable to the vehicle, a jacket having an aperture, a steering shaft supported by the jacket, a form-fit element externally abutting the jacket and at least partially covering the jacket aperture, a nut member positioned at least partially inside the jacket aperture, a bending strap having a jacket portion and a rack portion, and a locking assembly configured to selectively restrict the rack portion from moving relative to the bracket. The steering shaft is rotatable relative to the jacket about a longitudinal axis of the steering shaft, and the form-fit element is coupled to the jacket and has a void. The rack portion overlays and is separated from the jacket portion, the jacket portion has an area with a perimeter that is complementary to the void of the form-fit element, the area has a through hole, the area is seated in the void, and a fastener passes through the bending strap through hole and the form-fit element and is anchored in the nut member to couple the jacket portion to the jacket.

According to still another embodiment, a steering column assembly for use with a vehicle includes a jacket having an aperture, a steering shaft supported by the jacket, a form-fit element externally abutting the jacket and at least partially covering the jacket aperture, a nut member positioned at least partially inside the jacket aperture, and a bending strap having a jacket portion and a rack portion. The steering shaft is rotatable relative to the jacket about a longitudinal axis of the steering shaft, and the form-fit element is fixed to the jacket and has a void. The rack portion overlays and is separated from the jacket portion, the jacket portion has an area irrotatably seated in the void, the area has a through hole, and a fastener passes through the bending strap through hole and the form-fit element and is anchored in the nut member to couple the jacket portion to the jacket.

In an embodiment, the rack portion has a plurality of teeth.

According to yet another embodiment, a steering column assembly for use with a vehicle includes a jacket having an aperture, a steering shaft supported by the jacket, a form-fit element at least partially covering the jacket aperture, a nut member positioned at least partially inside the jacket aperture, a toothed rack having a plurality of teeth, and a bending strap having a jacket portion and a rack portion. The steering shaft is rotatable relative to the jacket about a longitudinal axis of the steering shaft, and the form-fit element is fixed to an outside of the jacket and has a void. The rack portion overlays and is separated from the jacket portion, the jacket portion has an area irrotatably seated in the void, the area has a through hole, the rack portion is positioned adjacent the toothed rack, a fastener passes through the bending strap through hole and the form-fit element and is anchored in the nut member to couple the jacket portion to the jacket, and another fastener couples the rack portion to the toothed rack.

According to still yet another embodiment, a steering column assembly for use with a vehicle includes a bracket connectable with the vehicle, a jacket having an aperture and a wall thickness at the aperture, a steering shaft supported by the jacket, a bending strap having a jacket portion and a rack portion, an engaging body irrotatably positioned at least partially inside the jacket aperture, and a locking assembly configured to selectively restrict the rack portion from moving relative to the bracket. The steering shaft is rotatable relative to the jacket about a longitudinal axis of the steering shaft, and the rack portion overlays and is separated from the jacket portion. The engaging body is coupled to or forms part of the bending strap jacket portion and thereby couples the bending strap rack portion to the jacket. The engaging body has a thickness that extends toward the longitudinal axis of the steering shaft past the jacket wall thickness at the aperture.

In an embodiment, the rack portion has a plurality of teeth.

In an embodiment, a toothed rack has a plurality of teeth and defines an elongate channel. The rack portion is positioned inside the channel of the toothed rack, and a fastener couples the rack portion to the toothed rack.

In an embodiment, the engaging body is coupled to the jacket by welding.

In an embodiment, the engaging body is coupled to the bending strap jacket portion.

In an embodiment, the engaging body forms part of the bending strap jacket portion.

In an embodiment, the locking assembly includes a casing, a clamping lever, and a toothed catch. The casing has a circumferential portion and extends alongside the jacket to allow axial movement of the jacket relative to the casing. The circumferential portion wraps at least partially around the jacket. The clamping lever has a locking shaft and a lever. The locking shaft is rotatably coupled to the bracket, and a cam and the lever extend from the locking shaft. The toothed catch has a hook for interacting with the cam and a toothed portion for interacting with the rack portion. Movement of the cam in one direction causes the toothed catch to disengage from the rack portion, and movement of the cam in an opposite direction allows the toothed catch to engage the rack portion.

In an embodiment, the rack portion has a plurality of teeth and the toothed portion interacts with the teeth.

In an embodiment, a toothed rack has a plurality of teeth and defines an elongate channel. The rack portion is positioned inside the channel of the toothed rack, a fastener couples the rack portion to the toothed rack, and the toothed portion interacts with the teeth.

In an embodiment, the clamping lever includes a clutch selectively allowing rotational force to be transmitted from the lever to the locking shaft.

In an embodiment, the steering column assembly includes a resin pin between the bending strap rack portion and the jacket.

In an embodiment, the steering column assembly includes teeth on the toothed rack and the bending strap rack portion.

According to a further embodiment, a steering column assembly for use with a vehicle includes a jacket having an aperture, a steering shaft supported by the jacket, a form-fit element externally abutting the jacket and at least partially covering the jacket aperture, a nut member positioned at least partially inside the jacket aperture, and a bending strap having a jacket portion and a rack portion. The steering shaft is rotatable relative to the jacket about a longitudinal axis of the steering shaft, the form-fit element is fixed to the jacket and has a void, and the nut member is separable from the form-fit element. The rack portion overlays and is separated from the jacket portion, the jacket portion has an area irrotatably seated in the void, the area has a through hole, and a fastener passes through the bending strap through hole and the form-fit element and is anchored in the nut member to couple the jacket portion to the jacket.

In an embodiment, the rack portion has a plurality of teeth.

In an embodiment, a toothed rack has a plurality of teeth and a fastener couples the rack portion to the toothed rack.

In an embodiment, a concave surface of the nut member faces the area, and a convex surface of the nut member faces the longitudinal axis of the steering shaft.

In an embodiment, a convex surface of the nut member faces the area, and a concave surface of the nut member faces the longitudinal axis of the steering shaft.

In an embodiment, the bending strap jacket portion meets the bending strap rack portion at a turn, and the bending strap rack portion has an access hole aligned with the through hole of the area.

In an embodiment, the area has a thickness that is greater than a thickness of the form-fit element, the thickness of the form-fit element is greater than a wall thickness of the jacket, and the area has at least one protrusion extending toward the nut member. The at least one protrusion forms part of the thickness of the area.

In an embodiment, the locking assembly includes a casing, a clamping lever, and a toothed catch. The casing has a circumferential portion and extends alongside the jacket to allow axial movement of the jacket relative to the casing. The circumferential portion wraps at least partially around the jacket. The clamping lever has a locking shaft and a lever. The locking shaft is rotatably coupled to the bracket, and a cam and the lever extend from the locking shaft. The toothed catch has a hook for interacting with the cam and a toothed portion for interacting with the rack portion. Movement of the cam in one direction causes the toothed catch to disengage from the rack portion, and movement of the cam in an opposite direction allows the toothed catch to engage the rack portion.

In an embodiment, the rack portion has a plurality of teeth and the toothed portion interacts with the teeth.

In an embodiment, a toothed rack has a plurality of teeth and defines an elongate channel. The rack portion is positioned inside the channel of the toothed rack, a fastener couples the rack portion to the toothed rack, and the toothed portion interacts with the teeth.

In an embodiment, the jacket has a wall thickness at the aperture and the nut member extends toward the longitudinal axis of the steering shaft past the jacket wall thickness at the aperture.

According to a still further embodiment, a steering column assembly for use with a vehicle includes a jacket having an aperture and a wall thickness at the aperture, a steering shaft supported by the jacket, and a bending strap having a jacket portion and a rack portion. The steering shaft is rotatable relative to the jacket about a longitudinal axis of the steering shaft, the rack portion overlays and is separated from the jacket portion, and the jacket portion has an area irrotatably positioned in the aperture.

In an embodiment, the rack portion has a plurality of teeth.

In an embodiment, a toothed rack has a plurality of teeth and a fastener couples the rack portion to the toothed rack.

In an embodiment, part of the jacket portion underlays the jacket.

In an embodiment, the area has a thickness that extends toward the longitudinal axis of the steering shaft past the jacket wall thickness at the aperture.

In an embodiment, the area is welded to the jacket.

In an embodiment, a resin pin is between the bending strap rack portion and the jacket.

DETAILED DESCRIPTION

FIGS. 1 through 8B illustrate a steering column assembly 100, according to one embodiment. The steering column assembly 100 broadly includes a jacket 102 rotatably supporting a steering shaft 104 about a longitudinal axis 104a of the steering shaft 104. A steering wheel is coupled (directly or indirectly) to end 105 of the steering shaft 104, and rotation of the steering wheel causes the steering shaft 104 to rotate—which ultimately causes an automobile having the steering column assembly 100 to turn. As is typical in the automotive industry, a bracket 108 is anchored to a vehicle chassis, and the jacket 102 is allowed to tilt and lock relative to the bracket 108. Accordingly, a driver is able to incline the steering wheel in accordance with his preferences.

To further allow user customization, it may also be desirable to allow the sheering shaft 104 (and thus the steering wheel) to be moved toward and away from the driver and the vehicle's passenger compartment. And still further, in the event of a collision, it is not uncommon for the driver to strike the steering wheel with a substantial amount of force. To reduce the degree of trauma caused by striking the steering wheel, it may be desirable to allow the steering shaft 104 (and thus the steering wheel) to be moved away from the driver upon impact with the driver, preferably while absorbing energy. Energy-absorbing adjustment unit 110 may be particularly useful in achieving these goals.

The energy-absorbing adjustment unit 110 broadly includes a toothed rack 112, a bending strap 122, a form-fit element 132, a nut member 138, at least one fastener 142, and a locking assembly 150. As shown in FIGS. 1 through 4, the toothed rack 112 may have a plurality of teeth 113 extending therefrom and may define a channel 114. In the embodiment 100, the toothed rack 112 is generally C-shaped; but other shapes which allow the teeth 113 to extend therefrom and which define the channel 114 may alternately be used. And while it may be particularly desirable for the toothed rack 112 to be constructed of metal, composites and other materials may also be appropriate.

Figure 6:
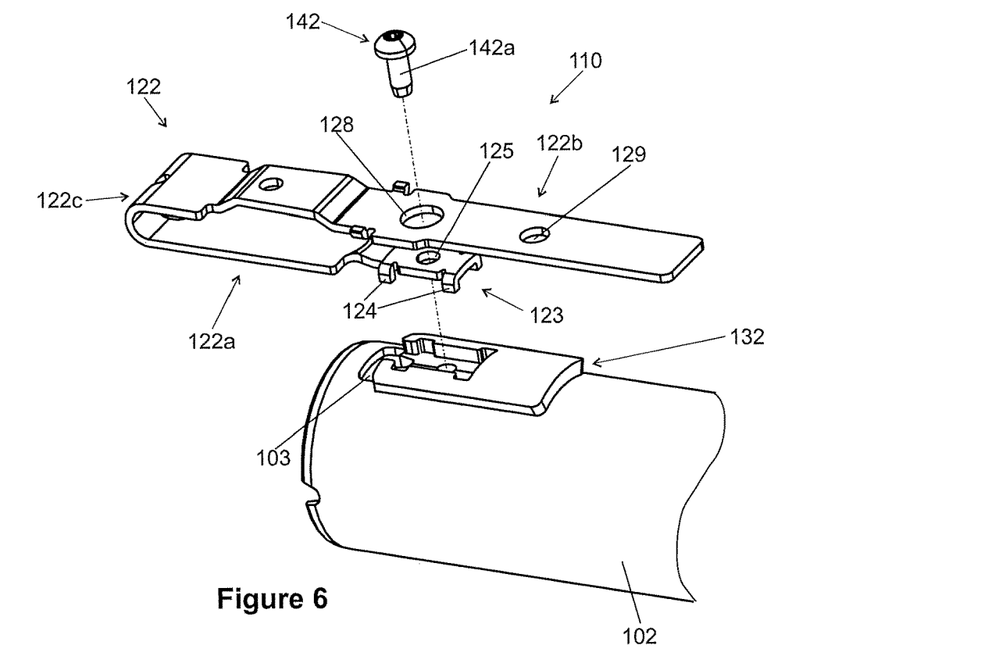
FIG. 6 is still yet another perspective view showing the energy-absorbing steering column assembly of FIG. 1, with some elements omitted and other elements exploded for clarity.

As discussed in more detail below, the bending strap 122 (FIGS. 4 through 8B) is coupled to both the jacket 102 and the toothed rack 112, and serves as an energy-absorbing connection between the jacket 102 and the locking assembly 150. The bending strap 122 has a jacket portion 122a and a rack portion 122b, and is bent or otherwise formed such that the strap 122 is generally J-shaped with the rack portion 122b overlying (and being separated from) the jacket portion 122a. Once the steering column assembly 100 is assembled, the jacket portion 122a is located relatively nearer to the jacket 102 and the rack portion 122b is located relatively further from the jacket 102. In embodiment 100, the jacket and rack portions 122a, 122b meet at a turn 122c, and the rack portion 122b extends beyond the jacket portion 122a away from the turn 122c, as shown in FIG. 6. The size, shape, and material composition of the bending strap 122 may vary based on the amount of force desired to be absorbed by the bending strap 122; but it may be particularly desirable for the bending strap 122 to fit inside the channel 114 (such that the bending strap 122 is not visible in FIGS. 1 and 2, for example).

Figure 7:
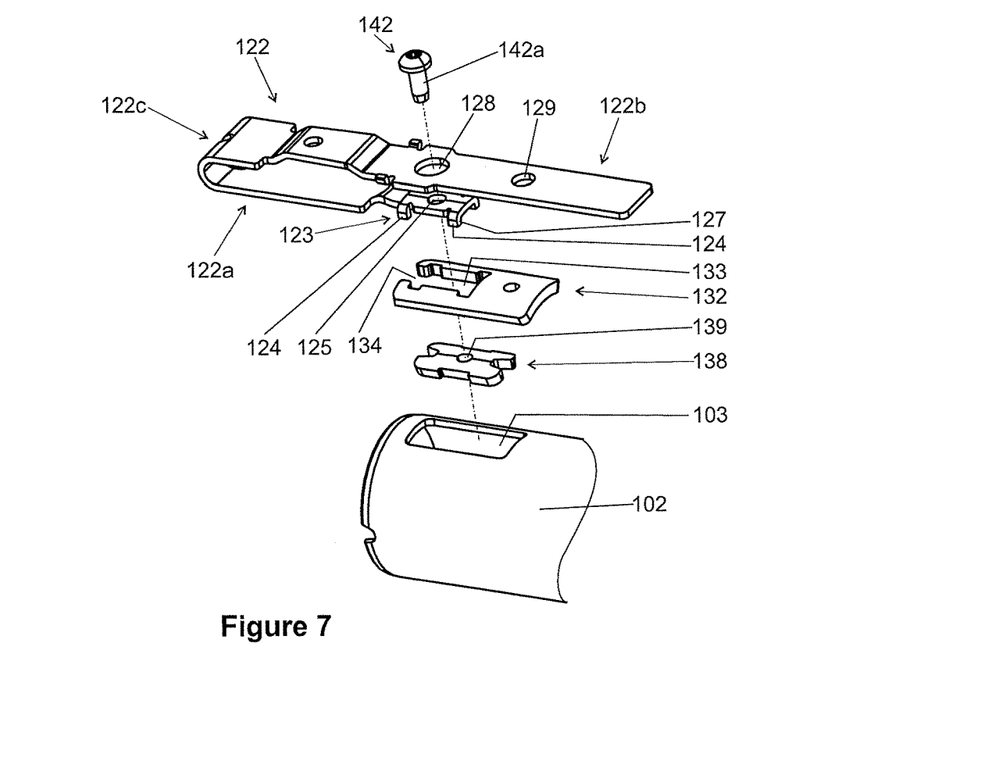
FIG. 7 is a further perspective view showing the energy-absorbing steering column assembly of FIG. 1, with some elements omitted and other elements exploded for clarity.
Figure 8A:
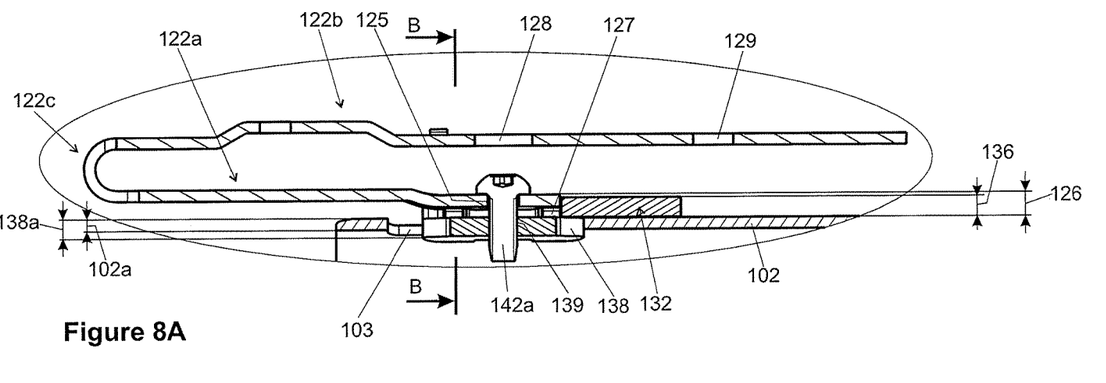
FIG. 8A is a section view taken from A-A in FIG. 4.

The jacket portion 122a of the bending strap 122 includes an end 123 having a perimeter that is complementary to a void 133 (FIG. 7) in the form-fit element 132, and it may be desirable for the end 123 and the void 133 to be shaped in a manner that restricts rotation of the end 123 inside the void 133. For example, the end 123 in embodiment 100 has four extensions (or "catch areas") 124 corresponding to similar areas in the void 133. The end 123 also includes a through hole 125, and it may be particularly desirable for a thickness (or "height") 126 of the end 123 to be greater than the thickness (or "height") 136 of the form-fit element 132, as shown in FIG. 8A. The thickness 126 of the end 123 may be altered in various ways. For example, the entire bending strap 122 may be constructed from a flat piece of material (e.g., metal) having a constant thickness, with that thickness selected to meet the desired height 126. Such a thickness may not provide desirable energy-absorption properties for the bending strap 122 as a whole, however. In other embodiments, the entire bending strap 122 may be constructed from a flat piece of material (e.g., metal) having a constant thickness, and the end 123 may be built up (such as through coatings or additive layering, for example), though such processes may be relatively expensive or time consuming. In embodiment 100, protrusions 127 away from the rack portion 122b are created, such as through bending, forming, or other appropriate processes, to arrive at the desired height 126. While it may be particularly desirable, as shown in FIG. 7, for the protrusions 127 to be the same as the catch areas 124, the protrusions 127 and the catch areas 124 may nevertheless be independent from one another.

Figure 3:
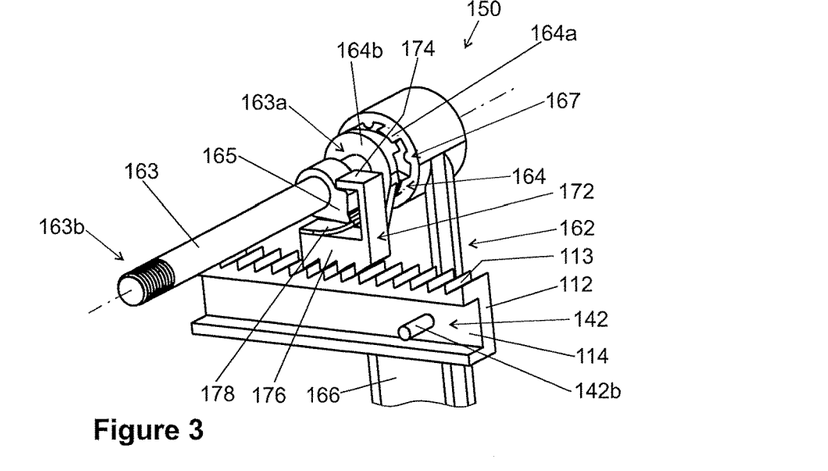
FIG. 3 is a perspective view showing part of an energy-absorbing unit and part of a locking assembly of the energy absorbing steering column assembly of FIG. 1.
Figure 4:
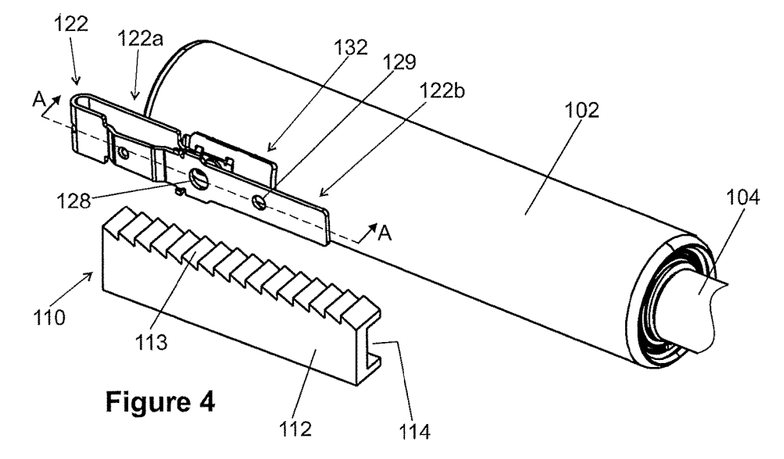
FIG. 4 is still another perspective view showing the energy-absorbing steering column assembly of FIG. 1, with some elements omitted and other elements exploded for clarity.
Figure 5:
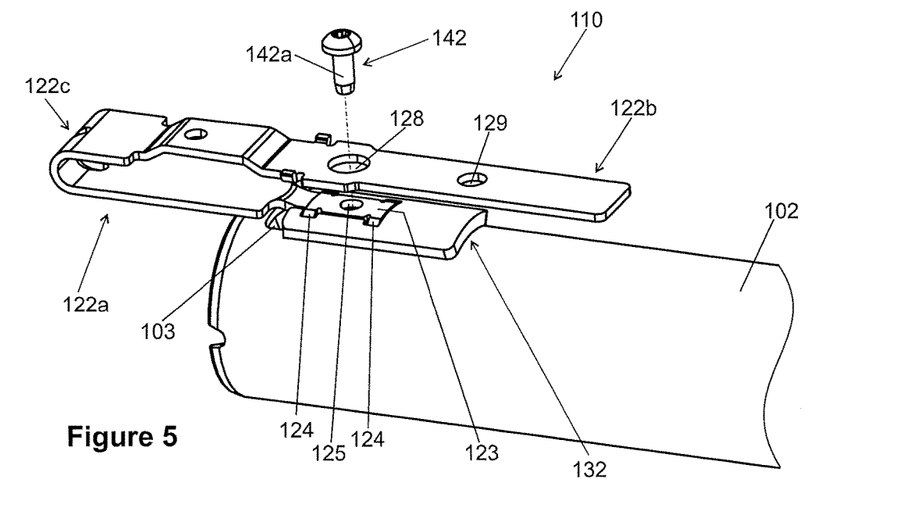
FIG. 5 is yet another perspective view showing the energy-absorbing steering column assembly of FIG. 1, with some elements omitted and other elements exploded for clarity.

As shown in FIGS. 4 through 7, the rack portion 122b of the bending strap 122 includes an access hole 128 sized and positioned such that screw 142a passes entirely therethrough and into the hole 125 in the jacket portion 122a. The rack portion 122b also has a coupling hole 129 for affixing the toothed rack 112 to the bending strap 122. For example, as shown in FIG. 3, the toothed rack 112 may be formed with an integral bolt 142b, and the bolt 142b may pass through the hole 129 and be secured with a nut. In other embodiments, the fastener 142 passing through the hole 129 may be initially separate from the toothed rack 112; in such embodiments, the fastener 142 may be inserted from either side of the hole 129 as desired. Those skilled in the art will appreciate that, while fasteners 142 are often referred to herein as being bolts or screws, other fasteners may also be utilized, such as clevis pins, rivets, welding, et cetera. Those skilled in the art will appreciate that the toothed rack 112 and the rack portion 122b of the bending strap 122 may in some embodiments be an integral, single-piece part; or, in other words, the rack portion may include teeth.

Attention is now directed to the form-fit element 132, best shown in FIGS. 4 through 8B. The form-fit element 132 is arcuate and externally abuts the jacket 102 to at least partially cover an aperture 103 in the jacket 102. The form-fit element 132 includes the void 133 (FIG. 7) discussed above and may preferably have an opening 134 (FIG. 7) extending from the void 133 to an end of the form-fit element 132. The form-fit element 132 is coupled to the jacket 102, such as through welding, adhesion, screws, or other fasteners. Welding or other fasteners which are especially durable and resistant to failure may be specifically desirable, as a failure in the coupling between the form-fit element 132 and the jacket 102 may particularly negate energy-absorbing properties of the steering column assembly 100. The wall thickness 136 of the form-fit element 132 may in some embodiments be larger than a wall thickness 102a of the jacket 102, and the thickness and material of the form-fit element 132 may be selected based on such parameters as weldability and material strength.

Figure 8B:
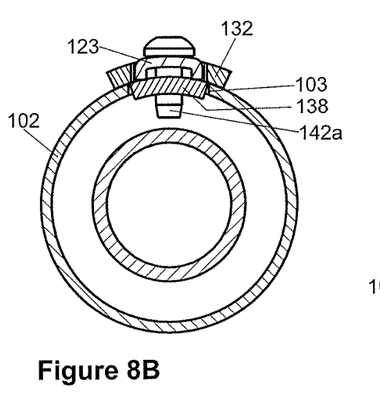
FIG. 8B is a section view taken from B-B in FIG. 8A.
Figure 8C:
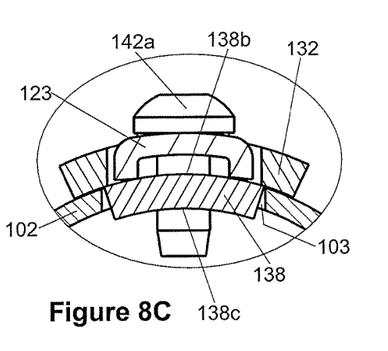
FIG. 8C is a section view taken from FIG. 8B.
Figure 8D:
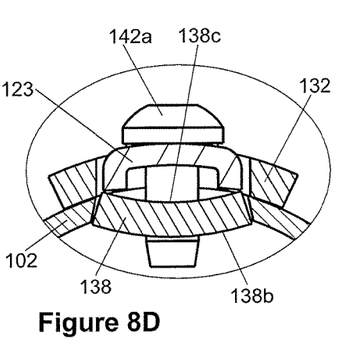
FIG. 8D is a section view taken from FIG. 8B, shown with a nut member at an alternate configuration than in FIG. 8C.

The nut member 138 is illustrated in the drawings as being separate from the form-fit element 132 (see FIG. 7); yet in some embodiments, the nut member 138 and the form-fit element 132 may have a unitary construction or be coupled together. The nut member 138 is sized to be positioned inside the jacket aperture 103, as shown in FIGS. 8A and 8B, and underlies the form-fit element 132. The shape of the nut member 138 is such that the nut member 138 cannot pass through the form-fit element 132, and the wall thickness 138a and the material of the nut member 138 may be selected based, for example, on material strength. Nevertheless, it may be particularly desirable for the wall thickness 138a to be greater than the wall thickness 102a of the jacket 102. The nut member 138 has a hole 139 and retains the screw 142a. In FIGS. 8A through 8C, a convex side 138b of the nut member 138 faces the form-fit element 132. But as shown in FIG. 8D, it may be desirable for a concave side 138c of the nut member 138 to face the form-fit element 132; with this arrangement, the nut member 138 may bend to be less bowed upon tightening the screw 142a to the nut member 138. This bending may further lock the nut member 138 to the hole 103.

Assembly of the elements discussed above is shown in FIGS. 4 through 8B. The form-fit element 132 is welded or otherwise fastened to the jacket 102, the nut member 138 is positioned inside the jacket aperture 103 behind the form-fit element 132, and the bending strap 122 is positioned to mate with the form-fit element 132. More particularly, the bending strap end 123 is placed in the void 133, and part of the bending strap 122 passes through the opening 134. The screw 142a then passes entirely through the access hole 128 in the bending strap rack portion 122b, partially through the hole 125 in the bending strap jacket portion 122a, and into the nut member hole 139—which anchors the screw 142a and thus fastens the bending strap end 123 to the nut member 138 (and to the form-fit element 132 and the jacket 102). The steering column assembly 100 is shown at this point of assembly in FIG. 4. Continuing, the toothed rack 112 is placed atop the bending strap 122 with the bending strap 122 located in the channel 114 and the bolt 142b (FIG. 3) passing through the hole 129. And a nut secures the bolt 142b to the bending strap rack portion 122b.

Figure 1:
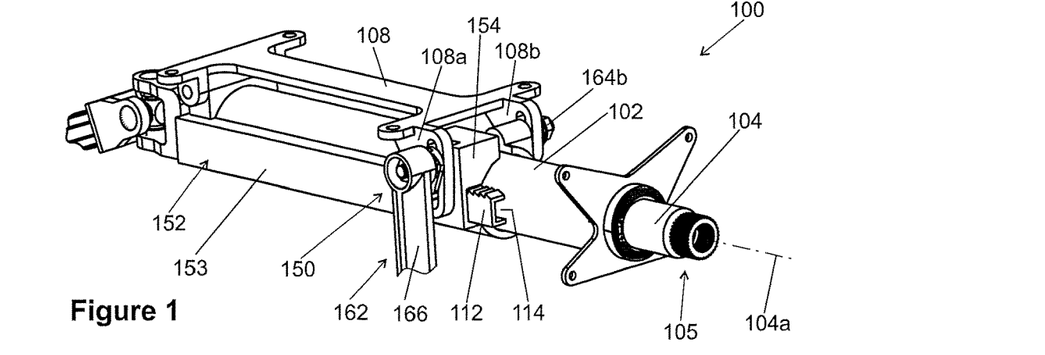
FIG. 1 is a perspective view showing an energy-absorbing steering column assembly, according to an embodiment of the present disclosure.
Figure 2:
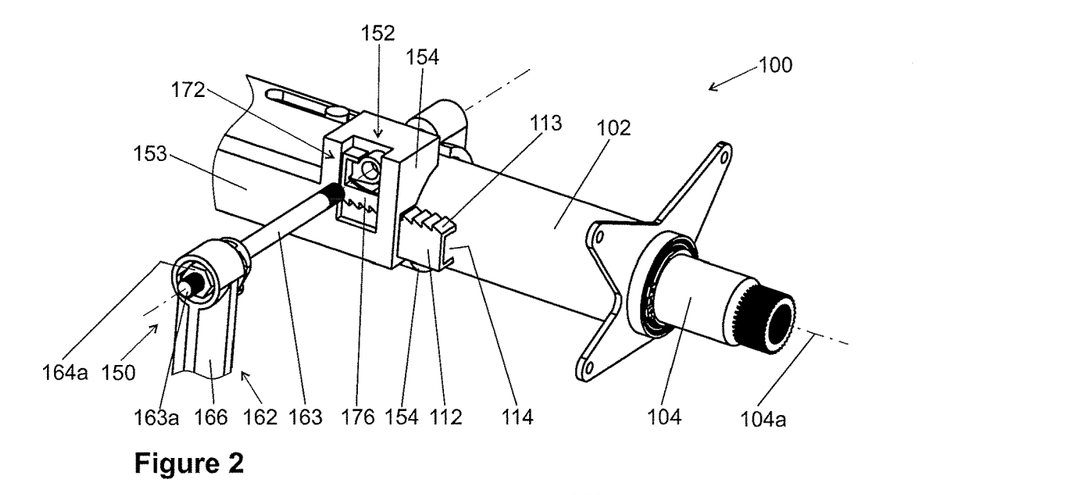
FIG. 2 is another perspective view showing the energy-absorbing steering column assembly of FIG. 1, with some elements omitted and other elements exploded for clarity.

Returning now to the locking assembly 150, shown in FIGS. 1 through 3, the locking assembly 150 includes a casing 152, a clamping lever 162, and a toothed catch 172. The casing 152 extends alongside the jacket 102, and is configured such that the casing 152 allows axial movement of the jacket 102 relative to the casing 152 without significant interference. As shown in FIGS. 1 and 2, the casing 152 may have a lengthwise portion 153 configured to enclose at least part of the toothed rack 112 and a circumferential portion 154 wrapping at least partially around the jacket 102. The lengthwise portion 153 is illustrated as extending outwardly and below the toothed rack 112 in FIG. 2, and the circumferential portion 154 is illustrated as being above (but not interfering with) the teeth 113 and also above and below the jacket 102.

The clamping lever 162 has a locking shaft 163 and a lever 166, and the locking shaft 163 passes through arms 108a, 108b of the bracket 108 and through the circumferential portion 154 of the casing 152. In effect, the casing 152 supports the jacket 102, and the clamping lever 162 fastens the casing 152 to the bracket 108. The lever 166 is fastened to the proximal end 163a (e.g., by nut 164a, shown in FIG. 1 and FIG. 2). A clamping system 164 comprises a cam disc lever 164a and a cam disc bracket 164b. The cam disc lever 164a is coupled with the lever 166. The cam disc bracket 164b is rotationally fixed to the arm 108a of the bracket 108. The cam disc lever 164a interacts with the cam disc bracket 164b to squeeze the arms 108a, 108b, the casing 152, and the jacket 102. The clamping system 164 is operated by the lever 166 and can be adjusted between a fixation position and an adjustment position. In the adjustment position, the driver can adjust the jacket 102 relative to the casing 152 to realize a length adjustment and the driver can pivot the jacket 102 and the casing 152 relative to the bracket 102 to realize a height adjustment. A cam 165 extends from the shaft 163 near the proximal end 163a, as discussed further below. And a distal end 163b of the locking shaft 163 may be anchored, such as by nut 164b (FIG. 1), to prevent the distal end 163b from pulling through the bracket arm 108b. The clamping lever 162 in embodiment 100 includes a clutch 167 (FIG. 3) allowing rotational force to be transmitted from the lever 166 to the shaft 163 when the lever 166 is moved sufficiently toward the shaft distal end 163b, and not transmitting rotational forces from the lever 166 to the shaft 163 when the lever 166 is moved sufficiently away from the shaft distal end 163b.

As shown in FIG. 3, the toothed catch 172 has a hook 174 for interacting with the cam 165, a toothed portion 176 for interacting with the teeth 113 of the toothed rack 112, and a spring 178 urging the toothed portion 176 toward the complementary teeth 113. The toothed catch 172 may be seated in the casing 152 (FIG. 2) such that significant movement of the toothed catch 172 is only allowed toward and away from the toothed rack 112.

In use, gravity and the spring 178 bias the toothed catch 172 toward the toothed rack 112, such that the toothed portion 176 interacts with the teeth 113 (FIG. 2) and prevents the jacket 102 from moving axially—and especially from moving axially away from the driver. To adjust the jacket 102 (and thus the steering wheel) toward or away from the driver, the lever 166 may be moved toward the shaft distal end 163b and rotated such that the cam 165 rises. Movement of the lever 166 may be accomplished manually or through automated means (motors, gearing, et cetera). As the cam 165 rises, the hook 174 is forced away from the toothed rack 112 and the jacket 102 may be adjusted axially—and especially away from the driver. Once the jacket 102 is positioned as desired, the cam 165 may be allowed to lower, which in turn again allows the toothed catch 172 to interact with the toothed rack 112 to provide a locking function (though in a different position).

Upon impact of a mass with the steering wheel (typically impact from the driver in the event of a collision), a substantial amount of force is exerted on the steering shaft 104—generally along the longitudinal axis 104a. The toothed catch 172 retains the toothed rack 112 in place, the bending strap rack portion 122b stays connected to the toothed rack 112, and the bending strap jacket portion 122a stays connected to the jacket 102. Forces from the impact are thus at least partially transferred from the steering shaft 104 to the jacket 102, and from the jacket 102 to the bending strap 122. The bending strap 122 deforms, absorbing at least some of the applied energy, and may ultimately tear once the amount of applied energy is above a designed threshold. The bending and tearing of the bending strap 122 allows the jacket 102 (and thus the steering shaft 104 and the steering wheel) to move along the longitudinal axis 104a (generally away from the driver).

Figure 9A:
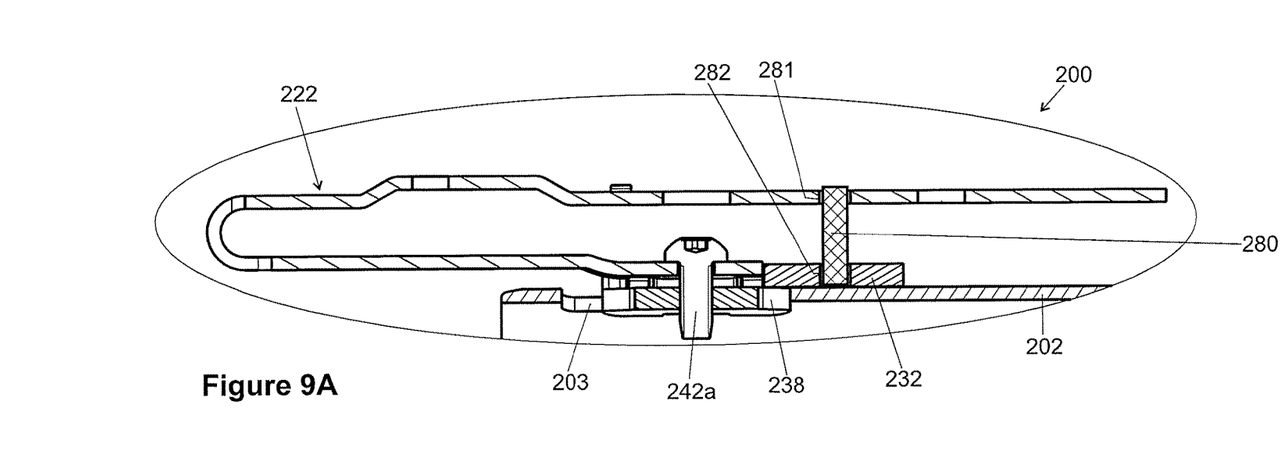
FIG. 9A is a section view similar to FIG. 8A, but showing an energy-absorbing steering column assembly according to another embodiment of the present disclosure.

FIG. 9A illustrates another steering column assembly 200 that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers from 200 to 299 may be used to indicate elements corresponding to those discussed above numbered from 100 to 199 (e.g., jacket 202 corresponds generally to the jacket 102, aperture 203 corresponds generally to the aperture 103, bending strap 222 corresponds generally to the bending strap 122, form-fit element 232 corresponds generally to the form-fit element 132, nut member 238 corresponds generally to the nut member 138, screw 242a corresponds generally to the screw 142a, et cetera), though with any noted, shown, or inherent deviations.

In embodiment 200, one difference from the embodiment 100 is that the embodiment 200 has a shear element 280 (e.g., a resin pin) coupled to the bending strap 222 and the form-fit element 232. The shear element 280 may pass through a hole 281 in the bending strap 222 and a hole 282 in the form-fit element 232, or may be adhered or otherwise fastened. In a crash having sufficient force, the shear element 280 shears to absorb energy.

Figure 9B:
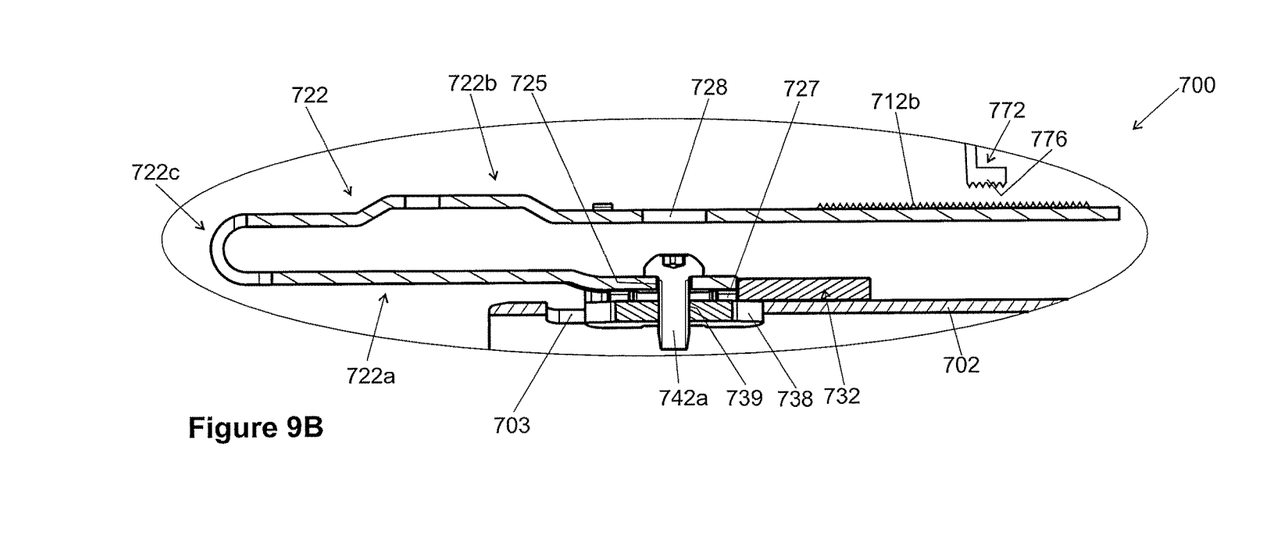
FIG. 9B is a section view similar to FIG. 8A, but showing an energy-absorbing steering column assembly according to another embodiment of the present disclosure.

FIG. 9B illustrates another steering column assembly 700 that is substantially similar to the embodiment 100, except as specifically noted and/or shown, or as would be inherent. Further, those skilled in the art will appreciate that the embodiment 100 (and thus the embodiment 700) may be modified in various ways, such as through incorporating all or part of any of the various described embodiments, for example. For uniformity and brevity, reference numbers from 700 to 799 may be used to indicate elements corresponding to those discussed above numbered from 100 to 199 (e.g., jacket 702 corresponds generally to the jacket 102, aperture 703 corresponds generally to the aperture 103, bending strap 722 corresponds generally to the bending strap 122, jacket portion 722a corresponds generally to the jacket portion 122a, rack portion 722b corresponds generally to the rack portion 122b, turn 722c corresponds generally to the turn 122c, hole 725 corresponds generally to the hole 125, protrusions 727 correspond generally to the protrusions 127, hole 728 corresponds generally to the hole 128, form-fit element 732 corresponds generally to the form-fit element 132, nut member 738 corresponds generally to the nut member 138, hole 739 corresponds generally to the hole 139, screw 742a corresponds generally to the screw 142a, et cetera), though with any noted, shown, or inherent deviations.

In embodiment 700, one difference from the embodiment 100 is that the embodiment 700 does not have a separate toothed rack. The bending strap rack portion 722b has a plurality of teeth 712b. The toothed catch 772 comprises a toothed portion 776, wherein the toothed portion 776 interacts with the teeth 712b to provide a locking function. The toothed catch 772 retains the bending strap rack portion 722b in place, and the bending strap jacket portion 722a stays connected to the jacket 702. Forces from impact are thus at least partially transferred from the steering shaft to the jacket 702, and from the jacket 702 to the bending strap 722. The bending strap 722 deforms, absorbing at least some of the applied energy, and may ultimately tear once the amount of applied energy is above a designed threshold. The bending and tearing of the bending strap 722 allows the jacket 702 to move along the longitudinal axis generally away from the driver.

Figure 10:
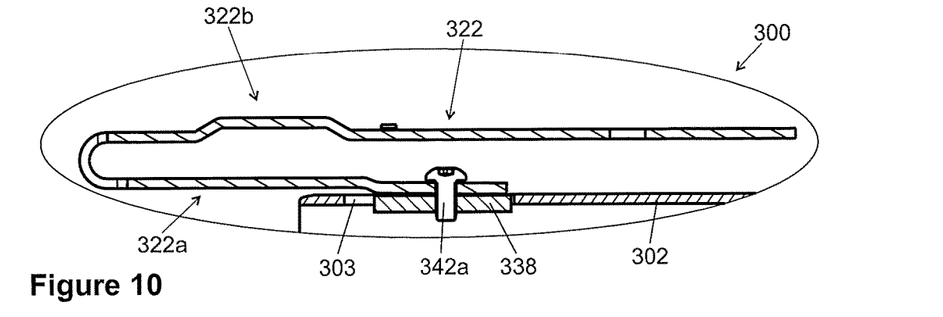
FIG. 10 is a section view similar to FIG. 8A, but showing an energy-absorbing steering column assembly according to still another embodiment of the present disclosure.
Figure 11:
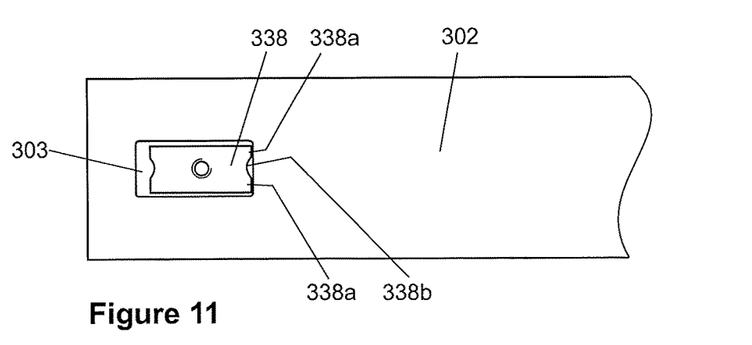
FIG. 11 is a partial side view showing part of the energy-absorbing steering column assembly of FIG. 10.

FIGS. 10 and 11 illustrate another steering column assembly 300 that is substantially similar to the embodiment 100, except as specifically noted and/or shown, or as would be inherent. Further, those skilled in the art will appreciate that the embodiment 100 (and thus the embodiment 300) may be modified in various ways, such as through incorporating all or part of any of the various described embodiments, for example. For uniformity and brevity, reference numbers from 300 to 399 may be used to indicate elements corresponding to those discussed above numbered from 100 to 199 (e.g., jacket 302 corresponds generally to the jacket 102, aperture 303 corresponds generally to the aperture 103, bending strap 322 corresponds generally to the bending strap 122, bending strap jacket portion 322a corresponds generally to the bending strap jacket portion 122a, bending strap rack portion 322b corresponds generally to the bending strap rack portion 122b, nut member 338 corresponds generally to the nut member 138, screw 342a corresponds generally to the screw 142a, et cetera), though with any noted, shown, or inherent deviations.

In embodiment 300, one difference from the embodiment 100 is that the embodiment 300 omits structure corresponding to the form-fit element 132. More particularly, similar to the nut member 138, the nut member 338 is sized to be positioned inside the jacket aperture 303 without passing through the aperture 303, or may be welded, adhered, or otherwise fastened to the jacket 302. FIG. 11 shows a nut member 338 that is smaller than the perimeter of the jacket aperture 303, but which may be welded to the jacket 302. The bending strap jacket portion 322a (FIG. 10) is coupled directly to the nut member 338 by the screw 342a. In this embodiment 300, the bending strap 322 does not directly contact the jacket 302 and no coupling structure overlays the jacket 302 adjacent the aperture 303. The nut member 338 has at least two protrusions 338a, which are in contact with the jacket 302. Furthermore the nut member 338 comprises a recess 338b between the at least two protrusions 338a.

Figure 12:
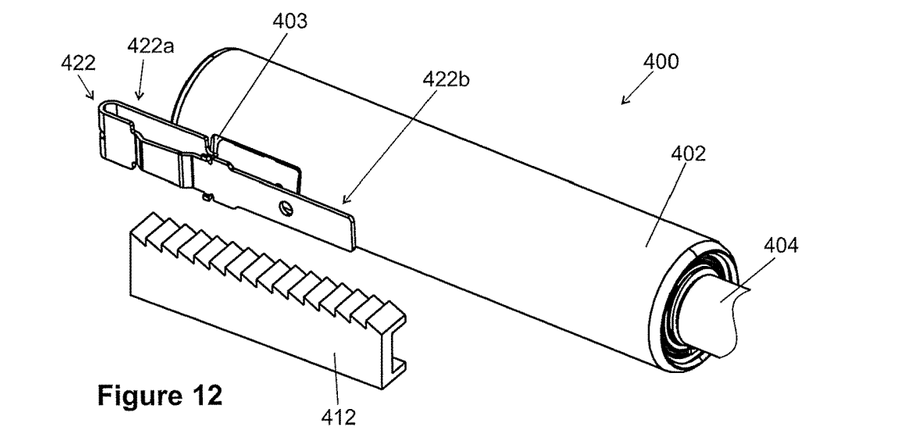
FIG. 12 is a perspective view similar to FIG. 4, but showing an energy-absorbing steering column assembly according to yet another embodiment of the present disclosure.
Figure 13:
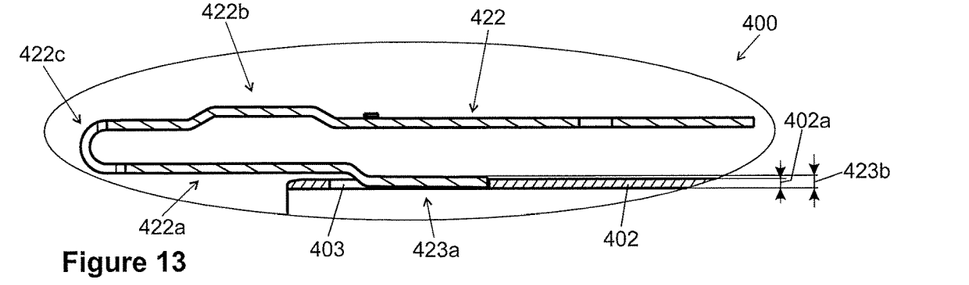
FIG. 13 is a section view similar to FIG. 8A, but showing the energy-absorbing steering column assembly of FIG. 12.

FIGS. 12 and 13 illustrate another steering column assembly 400 that is substantially similar to the embodiment 100, except as specifically noted and/or shown, or as would be inherent. Further, those skilled in the art will appreciate that the embodiment 100 (and thus the embodiment 400) may be modified in various ways, such as through incorporating all or part of any of the various described embodiments, for example. For uniformity and brevity, reference numbers from 400 to 499 may be used to indicate elements corresponding to those discussed above numbered from 100 to 199 (e.g., jacket 402 corresponds generally to the jacket 102, jacket wall thickness 402a corresponds generally to the jacket wall thickness 102a, aperture 403 corresponds generally to the aperture 103, steering shaft 404 corresponds generally to the steering shaft 104, toothed rack 412 corresponds generally to the toothed rack 112, bending strap 422 corresponds generally to the bending strap 122, bending strap jacket portion 422a corresponds generally to the bending strap jacket portion 122a, bending strap rack portion 422b corresponds generally to the bending strap rack portion 122b, bending strap turn 422c corresponds generally to the bending strap turn 122c et cetera), though with any noted, shown, or inherent deviations.

In embodiment 400, some differences from the embodiment 100 are that the embodiment 400 omits structure corresponding to the form-fit element 132, the nut member 138, and the screw 142a. More particularly, a portion 423a of the bending strap jacket portion 422a is positioned in the aperture 403 and coupled to the jacket 402, such as through welding or other appropriate fastening techniques. It may be particularly important for a wall thickness 423b of the portion 423a to be greater than the jacket wall thickness 403a; this may allow the jacket 402 to have a relatively small wall thickness 402a (and thus relatively reduced weight and cost) while providing a sufficient base for the bending strap 422. Moreover, it may be desirable for the bending strap 422 to only touch the jacket 402 at the portion 423a, and the bending strap 422 does not overlay the jacket 402 adjacent the aperture 403.

Figure 14:
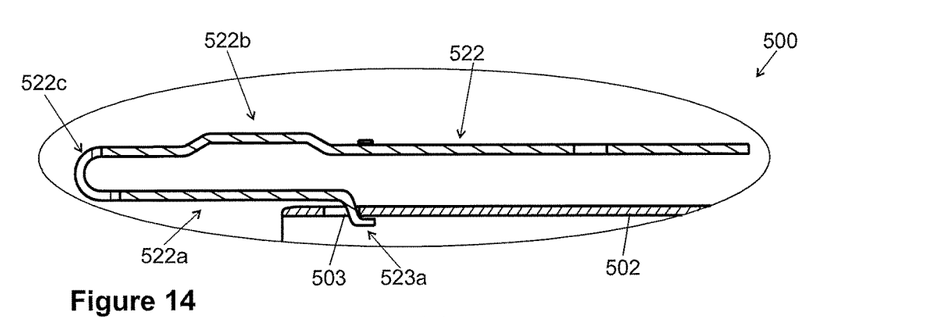
FIG. 14 is a section view similar to FIG. 8A, but showing an energy-absorbing steering column assembly according to still yet another embodiment of the present disclosure.

FIG. 14 illustrates another steering column assembly 500 that is substantially similar to the embodiment 400, except as specifically noted and/or shown, or as would be inherent. Further, those skilled in the art will appreciate that the embodiment 400 (and thus the embodiment 500) may be modified in various ways, such as through incorporating all or part of any of the various described embodiments, for example. For uniformity and brevity, reference numbers from 500 to 599 may be used to indicate elements corresponding to those discussed above numbered from 400 to 499 (e.g., jacket 502 corresponds generally to the jacket 402, aperture 503 corresponds generally to the aperture 403, bending strap 522 corresponds generally to the bending strap 422, bending strap jacket portion 522a corresponds generally to the bending strap jacket portion 422a, bending strap rack portion 522b corresponds generally to the bending strap rack portion 422b, bending strap turn 522c corresponds generally to the bending strap turn 422c, et cetera), though with any noted, shown, or inherent deviations.

In embodiment 500, a portion 523a of the bending strap jacket portion 522a passes through the aperture 503 and underlays the jacket 502, and the jacket aperture 503 is smaller than the jacket aperture 403. The portion 523a underlays the jacket 502 in a direction away from the turn 522c and is coupled to the jacket 502, such as through welding or other appropriate fastening techniques. And, as with the embodiment 400, it may be desirable for the bending strap 522 to only touch the jacket 502 at the portion 523a, with the bending strap 522 not overlaying the jacket 502 adjacent the aperture 503.

Figure 15:
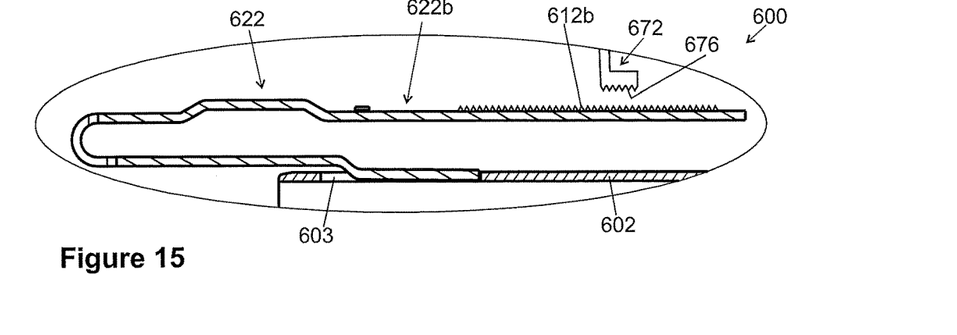
FIG. 15 is a section view similar to FIG. 8A, but showing an energy-absorbing steering column assembly according to a still further embodiment of the present disclosure.

FIG. 15 illustrates another steering column assembly 600 that is substantially similar to the embodiment 400, except as specifically noted and/or shown, or as would be inherent. Further, those skilled in the art will appreciate that the embodiment 400 (and thus the embodiment 600) may be modified in various ways, such as through incorporating all or part of any of the various described embodiments, for example. For uniformity and brevity, reference numbers from 600 to 699 may be used to indicate elements corresponding to those discussed above numbered from 400 to 499 (e.g., jacket 602 corresponds generally to the jacket 402, aperture 603 corresponds generally to the aperture 403, toothed rack 612 corresponds generally to the toothed rack 412, bending strap 622 corresponds generally to the bending strap 422, bending strap rack portion 622b corresponds generally to the bending strap rack portion 422b, et cetera), though with any noted, shown, or inherent deviations.

In embodiment 600, one difference from the embodiment 400 is that the embodiment 600 does not have a separate toothed rack. The bending strap rack portion 622b has a plurality of teeth 612b. The toothed catch 672 comprises a toothed portion 676, wherein the toothed portion 676 interacts with the teeth 612b to provide a locking function. The toothed catch 672 retains the bending strap rack portion 622b in place, and the bending strap jacket portion 622a stays connected to the jacket 602. Forces from impact are thus at least partially transferred from the steering shaft to the jacket 602, and from the jacket 602 to the bending strap 622. The bending strap 622 deforms, absorbing at least some of the applied energy, and may ultimately tear once the amount of applied energy is above a designed threshold. The bending and tearing of the bending strap 622 allows the jacket 602 to move along the longitudinal axis generally away from the driver.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. A steering column assembly for use with a vehicle, the steering column assembly comprising:
    a bracket connectable to the vehicle;
    a jacket having an aperture, the jacket having a wall thickness at the aperture;
    a steering shaft supported by the jacket, the steering shaft being rotatable relative to the jacket about a longitudinal axis of the steering shaft;
    a bending strap having a jacket portion and a rack portion, the rack portion overlying and being separated from the jacket portion;
    a locking assembly configured to selectively restrict the rack portion from moving relative to the bracket; and
    an engaging body irrotatably positioned at least partially inside the jacket aperture, the engaging body being coupled to the bending strap jacket portion and thereby coupling the bending strap rack portion to the jacket, the engaging body having a thickness that extends toward the longitudinal axis of the steering shaft past the jacket wall thickness at the aperture.

2. The steering column assembly of claim 1, wherein the engaging body is coupled to the jacket by welding.

3. The steering column assembly of claim 1, further comprising a resin pin between the bending strap rack portion and the jacket.

4. The steering column assembly of claim 1, further comprising teeth on the bending strap rack portion.

5. The steering column assembly of claim 1, wherein the locking assembly comprises:
    a casing extending alongside the jacket to allow axial movement of the jacket relative to the casing, the casing having a circumferential portion wrapping at least partially around the jacket;

a clamping lever having a locking shaft and a lever, the locking shaft being rotatably coupled to the bracket, a cam and the lever extending from the locking shaft; and a toothed catch having a hook for interacting with the cam and a toothed portion for interacting with a toothed rack, movement of the cam in one direction causing the toothed catch to disengage from the toothed rack, movement of the cam in an opposite direction allowing the toothed catch to engage with the toothed rack.

6. The steering column assembly of claim 5, wherein the clamping lever includes a clutch selectively allowing rotational force to be transmitted from the lever to the locking shaft.

7. A steering column assembly for use with a vehicle, the steering column assembly comprising:
   a bracket connectable to the vehicle;
   a jacket having an aperture, the jacket having a wall thickness at the aperture;
   a steering shaft supported by the jacket, the steering shaft being rotatable relative to the jacket about a longitudinal axis of the steering shaft;
   a bending strap having a jacket portion and a rack portion, the rack portion overlying and being separated from the jacket portion;
   a locking assembly configured to selectively restrict the rack portion from moving relative to the bracket;
   an engaging body irrotatably positioned at least partially inside the jacket aperture, the engaging body being coupled to the bending strap jacket portion and thereby coupling the bending strap rack portion to the jacket, the engaging body having a thickness that extends toward the longitudinal axis of the steering shaft past the jacket wall thickness at the aperture; and
   teeth on the bending strap rack portion;
   wherein the locking assembly comprises:
      a casing extending alongside the jacket to allow axial movement of the jacket relative to the casing, the casing having a circumferential portion wrapping at least partially around the jacket;
      a clamping lever having a locking shaft and a lever, the locking shaft being rotatably coupled to the bracket, a cam and the lever extending from the locking shaft; and
      a toothed catch having a hook for interacting with the cam and a toothed portion for interacting with the teeth on the bending strap rack portion, movement of the cam in one direction causing the toothed catch to disengage from the teeth on the bending strap rack portion, movement of the cam in an opposite direction allowing the toothed catch to engage with the teeth on the bending strap rack portion.

8. The steering column assembly of claim 7, wherein the clamping lever includes a clutch selectively allowing rotational force to be transmitted from the lever to the locking shaft.

9. A steering column assembly for use with a vehicle, the steering column assembly comprising:
   a jacket having an aperture;
   a steering shaft supported by the jacket, the steering shaft being rotatable relative to the jacket about a longitudinal axis of the steering shaft;
   a form-fit element externally abutting the jacket and at least partially covering the jacket aperture, the form-fit element being fixed to the jacket and having a void;
   a nut member positioned at least partially inside the jacket aperture, the nut member being separable from the form-fit element; and
   a bending strap having a jacket portion and a rack portion, the rack portion overlying and being separated from the jacket portion, the jacket portion having an area irrotatably seated in the void, the area having a through hole, a fastener passing through the bending strap through hole and the form-fit element and being anchored in the nut member to couple the jacket portion to the jacket.

10. The steering column assembly of claim 9, wherein a concave surface of the nut member faces the area, and therein a convex surface of the nut member faces the longitudinal axis of the steering shaft.

11. The steering column assembly of claim 9, wherein a convex surface of the nut member faces the area, and therein a concave surface of the nut member faces the longitudinal axis of the steering shaft.

12. The steering column assembly of claim 9, wherein the bending strap jacket portion meets the bending strap rack portion at a turn, and the bending strap rack portion has an access hole aligned with the through hole of the area.

13. The steering column assembly of claim 9, wherein:
   the area has a thickness that is greater than a thickness of the form-fit element;
   the thickness of the form-fit element is greater than a wall thickness of the jacket; and
   the area has at least one protrusion extending toward the nut member, the at least one protrusion forming part of the thickness of the area.

14. The steering column assembly of claim 9, further comprising a locking assembly configured to selectively restrict the rack portion from moving, the locking assembly comprising:
   a casing extending alongside the jacket to allow axial movement of the jacket relative to the casing, the casing having a circumferential portion wrapping at least partially around the jacket;
   a clamping lever having a locking shaft and a lever, the locking shaft being rotatably coupled to the bracket, a cam and the lever extending from the locking shaft; and
   a toothed catch having a hook for interacting with the cam and a toothed portion for interacting with teeth on the rack portion, movement of the cam in one direction causing the toothed catch to disengage from the teeth on the rack portion, movement of the cam in an opposite direction allowing the toothed catch to engage with the teeth on the rack portion.

15. The steering column assembly of claim 9, wherein:
   the jacket has a wall thickness at the aperture; and
   the nut member extends toward the longitudinal axis of the steering shaft past the jacket wall thickness at the aperture.

16. The steering column assembly of claim 9, further comprising a locking assembly configured to selectively restrict the rack portion from moving, the locking assembly comprising:
   a casing extending alongside the jacket to allow axial movement of the jacket relative to the casing, the casing having a circumferential portion wrapping at least partially around the jacket;
   a clamping lever having a locking shaft and a lever, the locking shaft being rotatably coupled to the bracket, a cam and the lever extending from the locking shaft; and
   a toothed catch having a hook for interacting with the cam and a toothed portion for interacting with a toothed rack, movement of the cam in one direction causing the toothed catch to disengage from the toothed rack, movement of the cam in an opposite direction allowing the toothed catch to engage with the toothed rack.

* * * * *